Jan. 3, 1933.  E. E. BURROWS  1,892,720
HEIGHT MEASURING ATTACHMENT
Filed Aug. 1, 1927   2 Sheets-Sheet 1

INVENTOR
ERNEST EDWIN BURROWS
BY
ATTORNEY

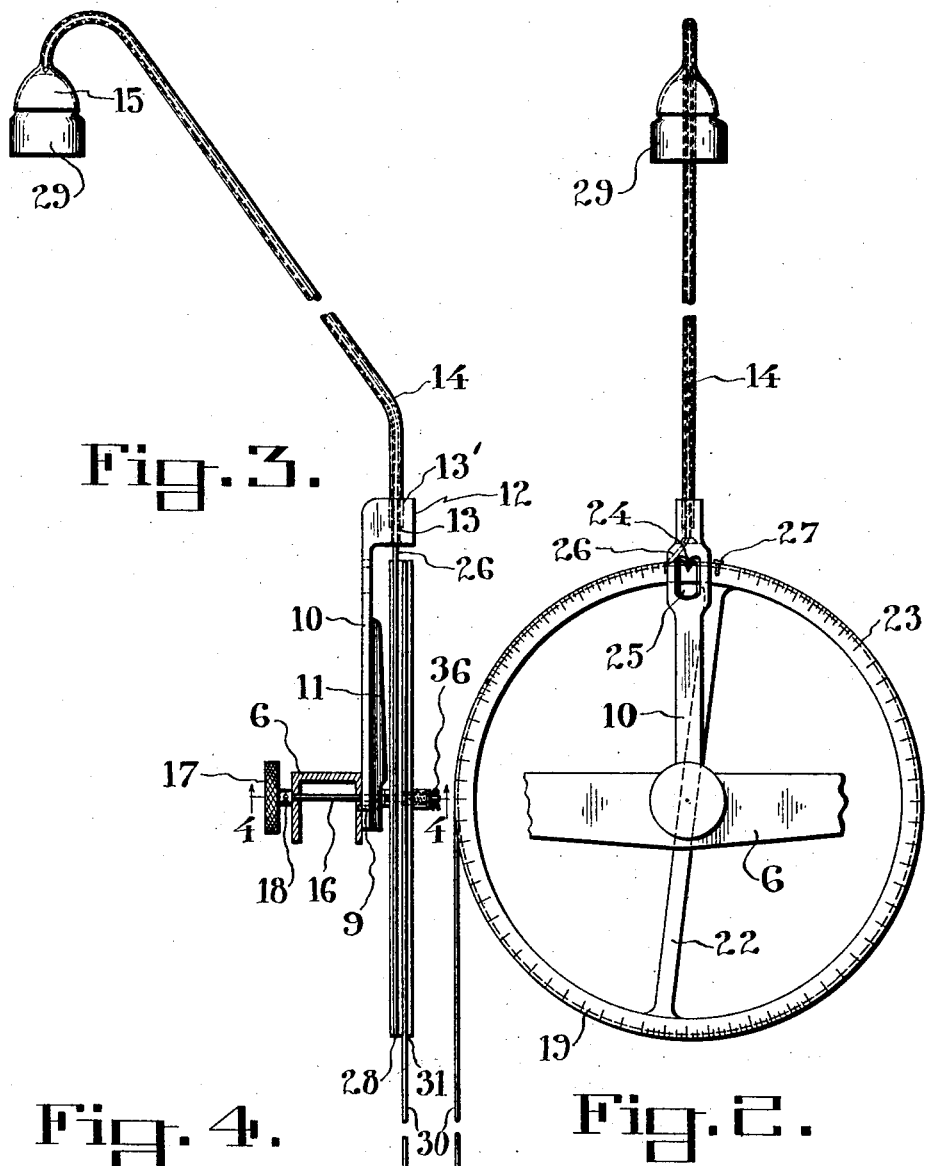
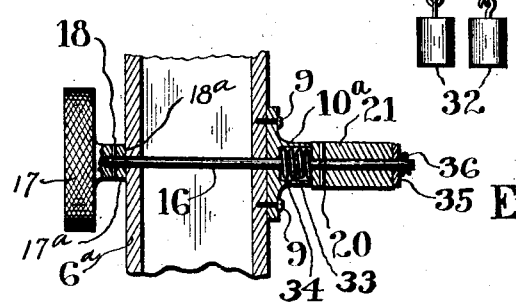

Patented Jan. 3, 1933

1,892,720

UNITED STATES PATENT OFFICE

ERNEST EDWIN BURROWS, OF ST. JOHNSBURY, VERMONT, ASSIGNOR TO E. AND T. FAIRBANKS AND COMPANY, OF ST. JOHNSBURY, VERMONT, A CORPORATION OF VERMONT

HEIGHT MEASURING ATTACHMENT

Application filed August 1, 1927. Serial No. 209,969.

This invention relates to weighing scales and more particularly to a height measuring attachment for weighing scales of the type known as personal scales, such as are used in schools, clubs, physicians' offices and the like.

It is the principal object of this invention to provide an attachment for a weighing scale adapted to measure the height of a person in inches and fractions thereof which will be simple, durable and inexpensive in construction and efficient and accurate in operation.

Another object of this invention is the provision of a height measuring device which will be quickly and easily detachable from a scale and adapted to be mounted on a wall or other suitable place.

Other features of the invention, together with certain details of construction and combination of parts, will be discussed in the specification and pointed out in the appended claims.

In the drawings;

Fig. 2 is a front elevational view, on an enlarged scale, of the height measuring attachment;

Fig. 3 is a cross-sectional view taken on line 3—3 in Fig. 1; and

Fig. 4 is a cross-sectional view taken on line 4—4 in Fig. 3.

Figure 1:
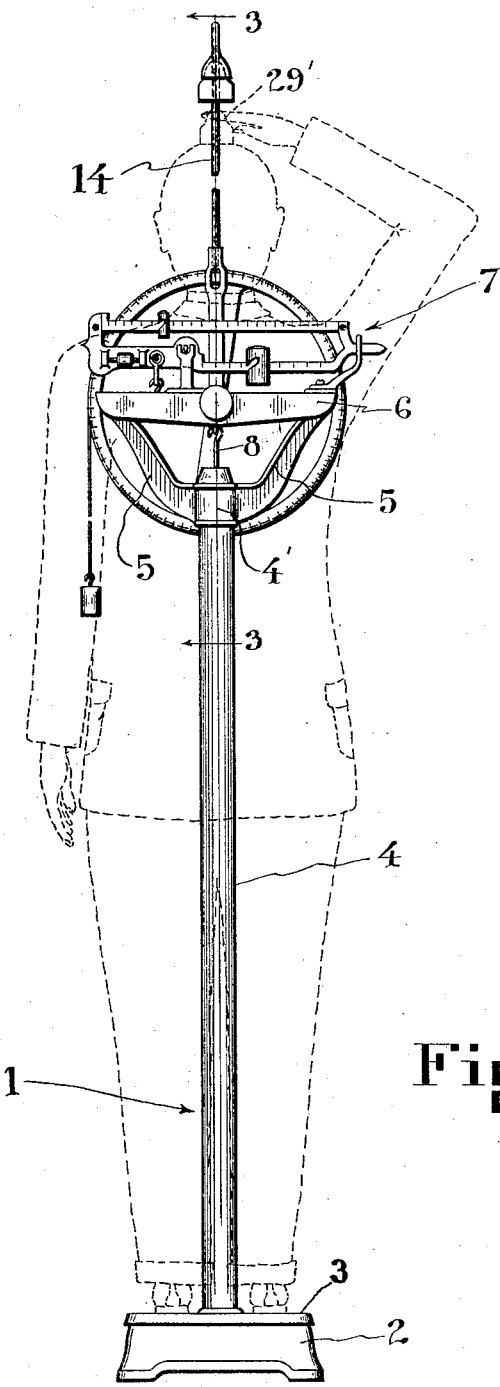
Fig. 1 is a front elevational view of a weighing scale with the height measuring attachment in position thereon and showing in dotted lines the method of using the attachment.

Referring to the drawings wherein the preferred embodiment of my invention is disclosed, there is shown a beam scale generally indicated by the reference numeral 1. comprising a frame 2 housing the scale levers (not shown) which sustain a platform 3, a hollow cylindrical pillar 4 at the upper extremity of which is mounted a sleeve 4' having a pair of divergent arms 5 extending upwardly therefrom which are adapted to support a shelf 6, and a beam outfit generally indicated by the reference character 7 suitably carried on the shelf 6 and connected to the scale levers by means of a steelyard rod 8 extending through the pillar 4, as is well understood in the art.

Rigidly attached to shelf 6, as by screws 9, is a vertically extending support 10 which is strengthened by means of a reinforcing rib 11. Cast integrally with the upper extremity of the bracket 10 and at right angles thereto is a boss 12 having an aperture 13 extending vertically therethrough. The upper portion of the aperture, is enlarged at 13' to receive the lower end of a bent tube 14. The other end of the tube is flared, as at 15, for a purpose hereinafter set forth.

A shaft 16 is journaled in the shelf 6 and a hand wheel 17 is attached to one end thereof by means of a pin 18. Also attached to the shaft 16, but on the side of the shelf opposite to the hand wheel 17, is a measuring wheel 19 which is securely held in position on the shaft by means of a pin 20 extending through a hub 21 formed on the spoke 22 of the measuring wheel. The wheel is graduated in quarter inches as is shown at 23, the graduations cooperating with an indicator 24 set in an opening 25 in the support 10.

One end of a cable 26 is attached, as at 27, to the measuring wheel and is guided in a peripheral groove 28 substantially about the circumference of the wheel, the cable as it leaves the wheel being threaded through aperture 13 and the free end of the cable passing out through the tube 14. A block 29 of wood, cork, or any suitable material is fastened to the free end of the cable, the block having a hemispherical knob 29' which is adapted to fit into the flared portion 15 of the bent tube 14.

The measuring wheel is adapted to be returned to normal position by the manipulation of hand wheel 17. To assist the hand wheel in this function, a second cable 30 is attached to the measuring wheel, also at 27 and is guided in a groove 31 running parallel to groove 28 in the periphery of the wheel. A weight 32 of sufficient mass is attached to the free end of cable 30.

To preclude a too rapid rotation of the wheel when the measuring device is put into operation a braking means is adapted to operate in conjunction with the hub portion 21 of the wheel. The braking mechanism comprises a spiral spring 33 seated around the shaft 16 in a recess 34 formed in the hub 10a of the support 10. The spring 33 is kept under compression by the action of the adjacent wheel hub 21, which presses the spring 33 against the inner wall of the recess 34, as shown in Fig. 4, while a washer 35, locked in position by a cotter pin 36, is mounted on the end of the shaft. This braking mechanism is thus made effective by the action of the spiral spring 33, compressed between the inner end of the wheel hub 21 and the end wall of the hub 10a, the spring 33 drawing inwardly the shaft 16 secured to hub 17a and hub 21 and thus holding the base 18a of the hand wheel hub 17a in gripping engagement with the outer depending flange 6a of the shelf 6, moreover, performing the additional function of retaining the wheel in any position into which it is placed by a pull on cable 26.

The operation of my device is as follows: A person seeking to ascertain his height measurement steps onto the platform of the scale and pulls down the block 29 until it just touches his head. The cable 26 attached to the block causes the rotation of the measuring wheel, said rotation stopping when the block touches the head. The reading is had by looking through the opening 25 in the bracket 10.

It will be understood that the measuring attachment is of such construction that it may be readily removed from a scale and attached to a wall or any other suitable structure and there used with the same facility as on the scale.

Having thus described my invention, what I claim as new and desire to secure by Letters Patent of the United States is:

1. In a device of the character described, a support having an opening therein, an indicator on said support and extending into said opening, a shaft mounted in said support, a wheel on said shaft, said wheel having indicia thereon cooperating with said indicator, means for rotating said wheel from its normal position, spring actuated braking means for permitting the wheel to be rotated and for holding the wheel in any position with relation to the said indicator and means for returning said wheel to said normal position.

2. In a device of the character described, a support having an opening therein, an indicator on said support and extending into said opening, a shaft mounted in said support, a wheel on said shaft, said wheel having indicia thereon cooperating with said indicator, spring actuated braking means for permitting the wheel to be rotated and for holding the wheel in any position with relation to the said indicator, a cable attached to said wheel adapted to cause rotation thereof from its normal position when operated by the hand of a user, and means for returning said wheel to said normal position.

3. In a device of the character described, a support having indicating means thereon, a bent tube mounted on said support, a shaft mounted in said support, a wheel having a groove in the periphery thereof mounted on said shaft, said wheel having indicia thereon adapted to cooperate with said indicating means, a cable adapted to rotate said wheel in one direction attached thereto and guided in said groove, said cable passing through said tube, manually operated means for moving said wheel in an opposite direction, and spring actuated braking means for permitting the wheel to be rotated and for holding the wheel in any position with relation to the said indicator.

4. In a device of the character described, a support provided with depending flanges and having an indicator and a hub thereon, a tube supported on said support, a shaft mounted in the depending flanges of said support and passing through said first mentioned hub, a hand wheel mounted on one end of said shaft and provided with a hub engaging one of said depending flanges, a wheel on said shaft and having a hub adjacent the first mentioned hub, said wheel having indicia thereon adapted to cooperate with said indicator, a cable attached to said wheel and adapted to cause rotation thereof, said cable extending through said tube, and a spiral spring surrounding said shaft and cooperating with the hub of the wheel and the hub of the support, whereby a braking action is exerted by said spring in drawing the hub of the hand wheel into gripping engagement with the depending flange in order to retain the wheel in position with relation to the indicator.

5. In a device of the character described, a shelf having a support extending therefrom, said support having a recess, an indicator on the said support, a shaft mounted in the said support and shelf and extending through said recess, a height indicating wheel having indicia thereon and having a hub adjacent to said recess by which said wheel is fixedly mounted on one end of the said shaft, an operating wheel secured to the other end of the shaft for rotating the said wheel, and a braking means for the said wheel comprising a spiral spring seated on the said shaft in said recess in the said support, being held in compression therein by engagement with the said wheel hub and adapted to co-operate therewith in drawing forward the said shaft and the hub of the said operating wheel, whereby the said hub will be held in gripping engagement with the said shelf.

6. In a device of the character described a shelf having depending flanges and having attached thereto a vertically extending support provided with a boss having a recess, an indicator on the said support, a shaft extending through the recess in the said boss and the depending flanges of the said shelf, a height indicating wheel having indicia thereon mounted and keyed on one end of the said shaft, an operating wheel provided with a hub engaging one of the depending flanges of the said shelf and keyed to the other end of the said shaft, and a spiral spring disposed in the said recess in the said boss of the support and encircling the said shaft, one end of the said spring engaging the hub of the height indicating wheel and being adapted to exert force on the said wheel hub, thereby causing the hub of the operating wheel to engage and grip the said shelf flange and thus hold the height indicating wheel in any position to which it may be turned.

ERNEST EDWIN BURROWS.